J. R. McFALL.
RESILIENT WHEEL.
APPLICATION FILED JUNE 19, 1919.
1,416,104. Patented May 16, 1922.
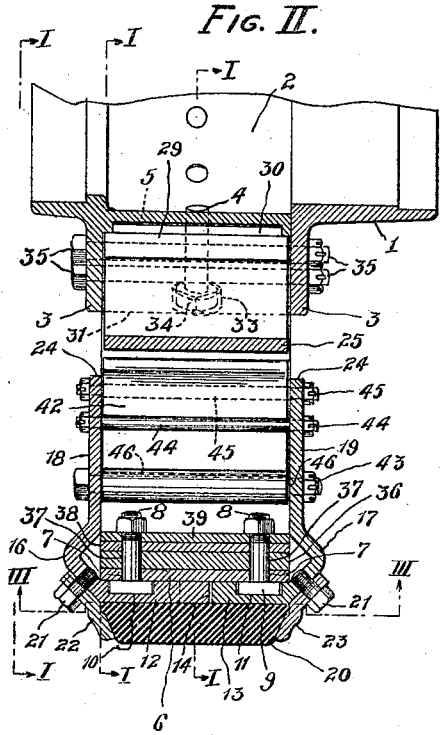
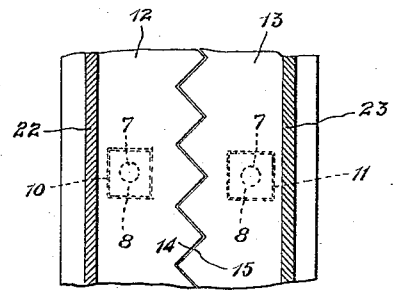
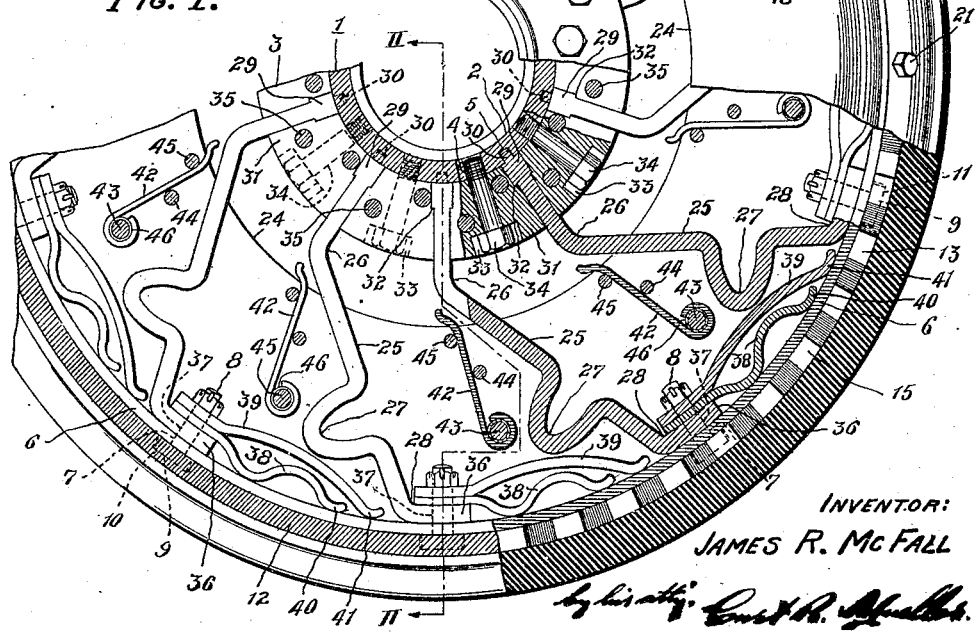
INVENTOR:
JAMES R. McFALL

UNITED STATES PATENT OFFICE.

JAMES R. McFALL, OF CLEVELAND, OHIO.

RESILIENT WHEEL.

1,416,104. Specification of Letters Patent. Patented May 16, 1922.

Application filed June 19, 1919. Serial No. 305,298.

*To all whom it may concern:*

Be it known that I, JAMES R. McFALL, a citizen of the United States, residing at 1742 E. 23rd St., Cleveland, in the county of Cuyahoga and State of Ohio, have invented a new and useful Improvement in Resilient Wheels, of which the following is a specification, the principle of the invention being herein explained and the best mode in which I have contemplated applying that principle, so as to distinguish it from other inventions.

My invention pertains to a resilient wheel and more particularly to a structure of this character in which movement of the hub is permitted relative to the rim of the wheel.

The object of my invention is to provide a construction wherein the rim of the wheel will maintain its round shape at all times regardless of the relative action of its hub which is connected therewith by means of resilient spokes. In this manner when one half of the periphery of the hub approaches the rim owing to the spokes on that side having yielded underload, the spokes around the other half of the wheel will be correspondingly expanded. In this manner an axle mounted in the hub will not be only supported from below, but suspended from above. Thereby insuring a participation of all of the spokes in sustaining a given load. A compensating or an automatic balancing result is had irrespective of the amount of load or varying road conditions. Other features of my invention are associated with various details of construction as will hereinafter appear.

Adverting to the drawings:—

Figure I is a broken side elevation partly in section of a resilient wheel embodying my invention.

Figure II is a section on zig-zag line II—II of Figure I.

Figure III is a section taken on line III—III of Figure II.

A hub 1 is fashioned with a suitable bearing 2 and has a pair of spaced outwardly extending annular plates 3. The hub is provided with a series of circumferentially arranged radially directed and screw threaded openings 4 and is also provided with a series of alternately arranged and similarly directed channels 5.

Inasmuch as the construction, so far as concerns the manner of supporting the resilient spokes is identical for each, the singular number will be hereinafter employed, that is to say, only one of all duplicated parts will be described.

A strong rigid rim 6, of considerably larger diameter than the hub 1, is provided in a particular radial plane with a pair of holes 7 through which a pair of bolts 8 are inserted so that their heads 9 lie against the outer surface of the rim. The bolt heads 9 are seated in similarly shaped depressions 10 and 11 which are formed in a pair of annular members 12 and 13 which surround and enclose the rim 6. The members 12 and 13 are fashioned with abutting zig-zag edges 14 and 15, as is shown in Figure III, whereby a saw-tooth connection is formed therebetween. The lateral ends of the members 12 and 13 are arched in opposite directions at 16 and 17 respectively and then continue in a substantially parallel direction inwardly, that is to say, toward the hub 1, thus constituting side walls 18 and 19 respectively. A solid rubber tire 20 surrounds the outer surfaces of the members 12 and 13 and by means of suitable circumferentially arranged cap screws 21 located on both sides of the wheel, is clamped and firmly held in position between a pair of clincher rings 22 and 23. As is well shown in Figure II the screws 21 secure the rings 22 and 23 to the lateral arched portions 16 and 17. The relative position of the inner edge 24 of one of these side walls is shown in Figure I.

Resilient spokes 25 preferably formed from flat spring steel stock include each a bend 26, and arch 27 and another bend 28 progressively nearer to the rim 6 in the order named. The spoke 25 instead of being substantially radial is bent forwardly owing to the bends 26 and 27 being made in the same direction. In other words, the end of the spoke nearest to the bend 28 or the end which is to be secured to the rim 6 is ahead of the point in the rim radially in line with the point of connection of the spoke with the hub, with reference to the intended direction of rotation indicated by the arrow in Figure I. The hub connecting end of the spoke is enlarged in opposite directions at 29 and its extremity is reduced at 30. Such reduced extremity 30 is fitted into the channels 5. As so inserted the shoulders formed between the portions 29 and 30 abut the outside of the hub 1. The hub attached end of the spoke is held in place by hollow anchor blocks 31 which abut the outer surface of the hub and have cut out sections fitted at 32 to the other shoulder formed by the enlargement 29. Each anchor block is fashioned with a countersunk hole 33 for the reception of an assembly cap screw 34 having screw threaded engagement with the holes 4 in the hub. Staggered bolts 35 passing laterally through the anchor blocks 31 secure the same to the hub plates 3.

The end of the spoke to be attached to the rim is shaped as an arcuate foot 36 extending along the inner surface of the rim 6 in a direction ahead with reference to the intended rotation of the wheel. The foot 36 is fashioned with a pair of holes 37 through which the bolts 8 also extend. The bolts 8 also pass through suitable holes formed in an abutting pair of ends of an excess spring 38 and a buffer leaf spring 39. Springs 38 and 39 have three extremities 40 and 41 respectively in engagement with the inner surface of the rim 6 and adapted to move when engaged and compressed by the bend 27 in the spoke which is ahead. As will be readily understood the springs 39 and 38 are intended to successively exercise their functions of relieving the strain of inordinate deflection of the bends 27. An auxiliary spring 42 is mounted upon a bolt 43 and has its free end passed between a pair of additional bolts 44 and 45 in which position it is adapted to be engaged by the bend 26 in the spoke.

I claim:—

1. A resilient wheel comprising a hub, a rim, resilient spokes attached to both hub and rim at points in a line at an angle to any particualr radial plane, and such that the points of attachment of every spoke with the rim is ahead of its point of attachment to the hub with reference to the intended direction of rolling movement of the wheel, the ends of said spokes which are attached to said rim being furthermore bent to lie along a measure of the inner annular surface thereof continuing ahead in the same general direction as the inclination of said spokes, springs attached to said rim and adapted to be engaged each by one of said spokes when the latter is partially deflected, and other springs adapted to be engaged each by one of said spokes when the latter is still further deflected.

2. A resilient wheel comprising the combination of a hub, a rim, resilient spokes therebetween, means for rigidly attaching the ends of said spokes, and springs carried by said rim for successively relieving different stages of the deflection of each of said spokes.

3. A resilient wheel comprising the combination of a hub, a rim, resilient spokes therebetween, means for rigidly attaching the ends of said spokes and pairs of springs carried along the inner side of said rim for successively relieving the deflection of any particular one of said spokes.

4. A resilient wheel comprising the combination of a hub, a rim, resilient spokes therebetween, means for attaching the ends of said spokes, and springs carried between said hub and rim for relieving the deflection of different portions of each of said spokes.

5. A resilient wheel comprising the combination of a hub, a rim, resilient spokes connecting said hub and rim and fashioned each with bends therebetween, means for attaching the ends of said spokes and springs carried between said hub and rim adapted to be engaged by the bends of said spokes respectively when deflected.

6. A resilient wheel comprising the combination of a hub, a rim, resilient spokes connecting said first mentioned parts, side walls enclosing said spokes, and springs supported by said walls between said spokes and adapted to resist the deflection of the latter.

7. A resilient wheel comprising the combination of a hub, a rim, resilient spokes connecting said first mentioned parts, side walls enclosing said spokes, and springs supported by said walls normally in spaced relation to said spokes and adapted to resist a deflection of the latter beyond a predetermined stage.

8. A resilient wheel comprising the combination of a hub, a rim, resilient spokes connecting said first mentioned parts, side walls enclosing said spokes, and springs supported by said walls between said spokes and adapted to resist the deflection of the latter, and means carried by said walls for reinforcing said springs.

9. A resilient wheel comprising the combination of a hub, a rim, resilient spokes connecting said hub and rim, side walls, and springs carried by said walls and rim respectively adapted to be engaged by said spokes respectively when deflected.

10. A resilient wheel comprising the combination of a hub, a rim, resilient spokes connecting said hub and rim, and springs carried by said rim adapted successively to be engaged one by a spoke and the other by the first.

11. A resilient wheel comprising the combination of a hub, a rim, resilient spokes, side walls and springs carried by said rim and by said walls respectively adjacent each spoke and adapted to be successively engaged by different portions of one of said spokes when deflected under load.

12. A resilient wheel comprising the combination of a hub, a rim, resilient spokes, side walls carried by said rim and enclosing said spokes, a leaf spring carried by said rim between each pair of spokes, a spring mounted upon said walls between each pair of spokes, each of said differently located springs adapted to be engaged by different portions of one of said spokes when deflected under load.

13. A resilient wheel comprising a hub having circumferentially spaced channels, a rim, spokes connecting said hub and rim and each having a reduced extremity fitted in one of said channels, each spoke being fashioned with an enlargement to form a shoulder, anchor block attached to said hub between each pair of spokes and having each a cut-out section to form a shoulder, said cut-out sections being fitted around said spoke enlargements and means for drawing said shoulders against each other.

Signed by me, this 10th day of June, 1919.

JAMES R. McFALL.